United States Patent Office 2,806,039
Patented Sept. 10, 1957

2,806,039

STEROID INTERMEDIATES

Maxton F. Murray, Kalamazoo Township, Kalamazoo County, Arnold C. Ott, Kalamazoo, and Raymond L. Pederson, Kalamazoo Township, Kalamazoo County, Mich., assignors to The Upjohn Company, Kalamazoo, Mich., a corporation of Michigan No Drawing. Application June 2, 1955,
Serial No. 512,884

14 Claims. (Cl. 260—345.2)

This invention relates to organic compounds, and is more particularly concerned with novel 13,17-secoandrostanes and methods for the preparation thereof.

The object of the present invention is to provide novel substituted secoandrostanes and a process for their production. Another object is the provision of a process for the conversion of steroid D-ring lactones to 3β,17-diacyloxy-13,17-seco-18-norandrostan-13-one. A still further object is the provision of a process for the conversion of 3β,13α,17-triacyloxy-13,17-secoandrostane to 3β,17-diacyloxy-13,17-seco-13(18)-androstene. Another object is the provision of a process for the conversion of 3β-acyloxy-13α-hydroxy-13,17-secoandrostan-17-oic acid lactone to 3β,17-dihydroxy-13,17-seco-18-norandrostan-13-one hemiketal. Other objects of the present invention will be apparent to one skilled in the art to which this invention pertains.

The starting compounds of the present invention are 3β - acyloxy-13α-hydroxy-13,17-secoandrostan-17-oic acid lactones wherein the acyl radical may contain from one to eight carbon atoms, inclusive. The preferred starting compound is 3β-acetoxy - 13α - hydroxy-13,17-secoandrostan-17-oic acid lactone. The starting material is first reduced with lithium aluminum hydride to give 3β,13α,17-trihydroxy-13,17-secoandrostane.

The 3β,13α,17-trihydroxy - 13,17 - secoandrostane obtained in the reduction is then acylated and dehydrated with an acyl halide or anhydride of an organic carboxylic acid containing from one to eight carbon atoms, inclusive; benzoyl chloride being preferred. The reaction is preferably carried out in the presence of a tertiary amine to which a halogenated alkane may be added. The acylation-dehydration results in the production of two products 3β,13α,17-triacyloxy-13,17-secoandrostane and 3β,17-diacyloxy-13,17-seco-13(18)-androstene.

It has been found that 3β,13α,17-triacyloxy-13,17-secoandrostane when treated with a tertiary amine unexpectedly does not form a double bond in the nucleus but forms an unsaturated bond between carbon atoms 13 and 18 to give a methylene group adjacent to the nucleus. Thus, when the acylation is carried out with benzoyl chloride, both 3β,13α,17-tribenzoxy-13,17-secoandrostane and 3β,17-dibenzoxy-13,17 - seco - 13(18)-androstene are obtained. The former, 3β,13α,17-tribenzoxy-13,17-secoandrostane, is readily converted into the latter, 3β,17-dibenzoxy-13,17-seco-13(18)-androstene, in the presence of a tertiary amine, preferably dimethylaniline.

The 3β,17-diacyloxy-13,17-seco-13(18)-androstene is readily converted to 3β,17-diacyloxy-13,17-seco-18-norandrostane-13-one by ozonization and decomposition of the ozonide. If, as in the preferred embodiment of the invention, the ozonization is carried out on the benzoxy derivative, the product obtained is 3β,17-dibenzoxy-13,17-seco-18-norandrostan-13-one.

The 3β,17 - diacyloxy-13,17-seco-18-norandrostane-13-one is easily hydrolyzed to 3β,17-dihydroxy-13,17-seco-18-norandrostan-13-one, which then, through ring closure, forms a hemiketal.

A preferred embodiment of the process of the present invention and the novel compounds of the present invention produced and utilized therein may be representatively illustrated in the following chart in which the acyl group refers to an acyl radical of an organic carboxylic acid containing between one and eight carbon atoms; preferably a hydrocarbon carboxylic acid containing between one and eight carbon atoms.

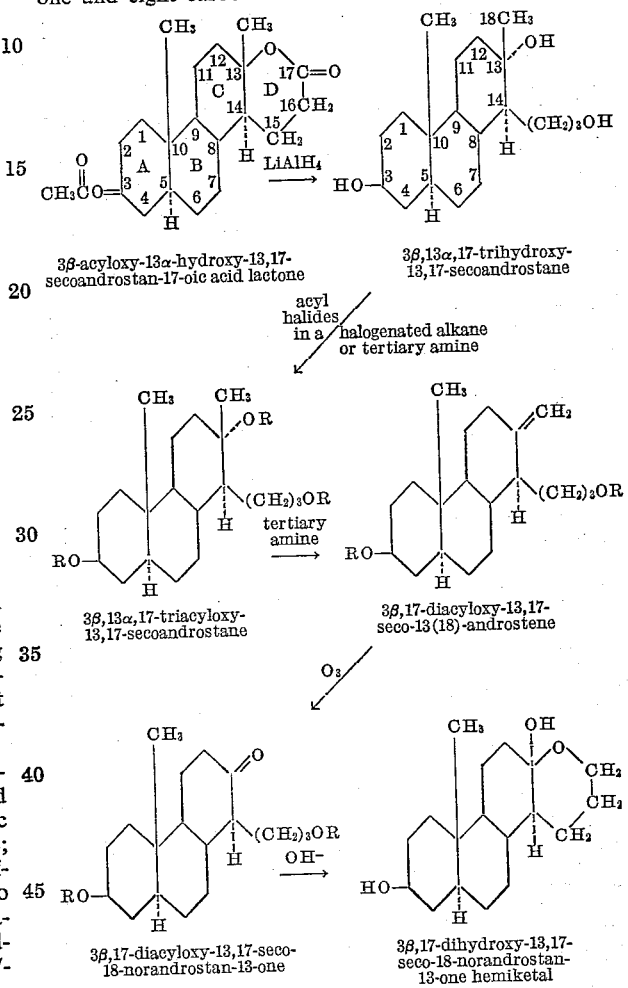

The compounds obtained by the present invention are valuable intermediates in the total synthesis of physiologically active steroids, such as hormones. For example, treatment of 3β,17-diacyloxy-13,17-seco-18-norandrostan-13-one with hydrogen cyanide in ethanol gives 3β,17 - diacyloxy - 13 - cyano - 13 - hydroxy - 13,17-seco-18-norandrostane, which on hydrolysis with hydrochloric acid followed by dehydration with phosphorus pentachloride or phosphorus pentoxide results in 3β,17-dihydroxy - 13 - carboxy - 13,17 - seco - 18 - nor - 13-androstene. On hydrogenating this product in the presence of palladium on carbon to saturate the double bond between carbon atom 13 and carbon atom 14, and oxidizing with chromic acid, 3-keto-13-carboxy-13,17-seco-androstan-17-oic acid is obtained. The acid is converted with diazomethane in ether to its dimethyl ester and then treated with hydrogen in the presence of platinum followed by treatment with sodium ethoxide to form 3β-hydroxy - 13 - carbomethoxy - 18 - norandrostan - 17-one by ring closure [Fieser and Fieser, Natural Products Related to Phenanthrene, 3rd edition, page 339]. This product on hydrolysis with an acetic acid-hydrochloric acid mixture forms 3β-hydroxy-18-norandrostan-17-one, which on reaction with hydrogen cyanide in ethanol produces 3β,17-dihydroxy-17-cyanoandrostane. This product on treatment with hydrogen over platinum and acetic acid gives 3β,17-dihydroxy-17-aminomethylandrostane which by the Tiffeneau ring enlargement method [Compt. rend. 205, 54 (1937)] using sodium nitrite and acetic acid forms 3β-hydroxy-18-nor-D-homoandrostane-17a-one. Mild chromic acid oxidation of this product gives 18-nor-D-homoandrostan-3,17a-dione having androgenic activity, Johnson et al., J. Am. Chem. Soc. 75:4866 (1953).

The 3β,17 - dihydroxy - 13,17 - seco - 18 - norandrostan-13-one hemiketal also possesses valuable antifungal and antiyeast properties.

In carrying out the process of the invention, a 3β-acyloxy - 13α - hydroxy - 13,17 - secoandrostan - 17 - oic acid lactone, wherein the acyl radical may contain from one to eight carbon atoms, inclusive, is reduced with lithium aluminum hydride at a temperature of between minus twenty degrees and plus fifty degrees centigrade, with a temperature of zero to plus thirty degrees being preferred. The reduction may be carried out in diethyl ether or tetrahydrofuran. The preferred starting material is 3β - acetoxy - 13α - hydroxy - 13,17 - secoandrostan-17-oic acid lactone, the same as "isoandrololactone" acetate prepared by Levy and Jacobsen [J. Biol. Chem. 171, 71 (1947)]. The lithium aluminum hydride is preferably added in tetrahydrofuran solution at room temperature during a period of about twenty minutes and the excess lithium aluminum hydride and the complex destroyed by the addition of water and mineral acid such as hydrochloric acid. Regardless of the particular acyl radical used in the starting material, the end product is 3β,13,α,17-trihydroxy-13,17-secandrostane.

The product obtained by the lithium aluminum hydride reduction is then acylated and dehydrated with an acyl halide or anhydride of an organic carboxylic acid containing one to eight carbon atoms; benzoyl chloride being preferred. The reaction is preferably carried out in pyridine solution, however other tertiary organic amines with or without the presence of a halogenated alkane, such as methylene chloride or alcohol-free chloroform, are also operable. The reaction is preferably carried out at a temperature range of ten to fifty degrees centigrade, although a range of zero to 100 degrees centigrade is operable. The reaction product contains both 3β,13α,17 - triacyloxy - 13,17 - secoandrostane and 3β,17 - diacyloxy - 13,17 - seco - 13(18) - androstene. The former, 3β,13α,17-triacyloxy-13,17-secoandrostane was refluxed with a tertiary amine, and after cooling diluted with ether or chloroform, to give 3β,17-diacyloxy-13,17-seco-13(18)-androstene. The preferred tertiary amines include dimethylaniline, collidine, lutidine and picoline. Other reasonably strong tertiary organic bases may also be used in place of the tertiary amine.

The course of this reaction was surprising in that instead of the expected formation of a double bond on the ring, it was found that the double bond formed between carbon atoms 13 and 18. The structure of the androstene was fixed by the ozonolysis of the next step which gave a 65 percent yield of a product which formed no precipitate with dimedone (1,1-dimethyl-3,5-diketo cyclohexane), showed no aldehyde group present by infrared absorption, and produced only a mono-semicarbazone when treated with excess semicarbazide. In addition formaldehyde was isolated as a by-product of the ozonolysis.

The 3β,17 - diacyloxy - 13,17 - seco - 13(18) - androstene is ozonized by treatment with ozone at a temperature of preferably between minus seventy to minus fifty degrees centigrade, though a temperature range of between minus seventy and plus fifty degrees is operable. The reaction can be carried out with ozonized air or ozonized oxygen in place of ozone. The solvents which can be used for the ozonization include methylene chloride-pyridine, ethyl acetate or acetic acid though acetic acid requires a higher temperature and thus reduces the efficiency of the reaction. The ozonide is decomposed with zinc dust and acetic acid or palladium on strontium carbonate. The product obtained is the corresponding 3β,17 - diacyloxy - 13,17 - seco - 18 - norandrostan-13-one. If the acylation is carried out with benzoyl chloride, as in the preferred embodiment, then the product obtained by the decomposition of the ozonide is 3β,17 - dibenzoxy - 13,17 - seco - 18 - norandrostan - 13-one.

The 3β,17 - diacyloxy - 13,17 - seco - 18 - norandrostan-13-one can be readily hydrolyzed with a base, such as sodium or potassium hydroxide or carbonate in ethyl alcohol-water solution to give a 3β,17-dihydroxy-13,17-seco-18-norandrostan-13-one which cyclizes to the hemiketal as can be seen from the fact that the infrared spectra showed no carbonyl absorption but did show strong hydroxyl absorption. The hydrolysis is preferably carried out between room temperature and eighty degrees centigrade, a temperature of about forty to fifty degrees being preferred.

The following examples are illustrative of the process and products of the present invention but are not to be considered as limiting.

Example 1.—3β,13α,17-trihydroxy-13,17-secoandrostane

A solution of 5.23 grams (0.015 mole) of 3β-acetoxy-13α-hydroxy-13,17-secoandrostan-17-oic acid lactone [the "Isoandrololactone" acetate of H. Levy and R. P. Jacobsen, J. Biol. Chem., 171, 71 (1947)] in fifty milliliters of tetrahydrofuran was added to a solution of 4.25 grams (0.1125 mole) of lithium aluminum hydride in 500 milliliters of tetrahydrofuran, with good stirring, at room temperature, over a period of 25 minutes. The mixture was stirred an additional ten minutes, and the excess lithium aluminum hydride decomposed by the dropwise addition of ten milliliters of water. The complex was then decomposed by rapid addition of 120 milliliters of 12 percent hydrochloric acid. The layers were separated, and the aqueous layer extracted several times with fifty-milliliter portions of tetrahydrofuran. The organic extracts were combined, washed twice with fifty-milliliter portions of half-saturated sodium chloride solution and dried over anhydrous sodium sulfate. After filtration, the solvent was removed under slightly reduced pressure. Recrystallization of the residue from 250 milliliters of absolute ethanol yielded 2.46 grams (53 percent) of 3β,13a,17-trihydroxy-13,17-secoandrostane melting at 218 to 223 degrees centigrade. An additional 1.67 grams (36 percent) of material melting at 219 to 222 degrees centigrade was recovered from the mother liquors. The total yield was 89 percent.

Upon further recrystallization from absolute ethanol, the following physical constants were obtained: Melting point 225 to 226 degrees centigrade; $[a]_D$ of plus five degrees in 95 percent ethanol.

Analysis.—Percent calculated for $C_{19}H_{34}O_3$: C, 73.50; H, 11.04. Found: C, 73.51; H, 11.05.

Example 2.—3β,13α,17-tribenzoxy-13,17-secoandrostane and 3β,17-dibenzoxy-13,17-seco-13(18)-androstene A solution of 9.33 grams (0.030 mole) of 3β,13α,17-trihydroxy-13,17-secoandrostane in 100 milliliters of dry pyridine was cooled to plus ten degrees centigrade, and nineteen grams (0.135 mole) of benzoyl chloride was added dropwise, with stirring, in twenty minutes. After stirring an additional fifteen minutes, the mixture was allowed to come to room temperature and stirred an additional eight hours. The mixture was then warmed to fifty degrees centigrade and stirred one hour at that temperature. After cooling 300 milliliters of a 2:1 ether: methylene chloride mixture was added, and the solution was then washed successively with ice-cold ten percent hydrochloric acid, water, ice-cold five percent sodium hydroxide solution, and water. The combined organic extracts were dried over anhydrous sodium sulfate, filtered, and the solvent removed by distillation. The residue was dissolved in fifty milliliters of methylene chloride and diluted with 600 milliliters of methanol. The solution was concentrated to 500 milliliters, and cooled in an ice bath. The precipitate so obtained was filtered, washed with cold methanol, and dried. The product, 3β, 17-dibenzoxy-13,17-seco-13(18)-androstene, weighed 7.47 grams (49.7 percent) and melted at 128–132 degrees centigrade. Recrystallization from methanol gave an analytical sample melting at 134 to 135 degrees centigrade and having an $[\alpha]_D^{26}$ of minus eighteen degrees (chloroform).

Analysis.—Calculated for $C_{33}H_{40}O_4$: C, 79.17; H, 8.05. Found: C, 78.92; H, 7.98.

From the mother liquors 0.48 gram (2.5 percent) of 3β,13α,17-tribenzoxy-13,17-secoandrostane melting at 171 to 173 degrees centigrade was obtained. Recrystallization from acetone gave an analytical sample melting at 175 to 176 degrees centigrade having an $[\alpha]_D^{26}$ of plus 26 degrees (chloroform).

Analysis.—Calculated for $C_{40}H_{46}O_6$: C, 77.14; H, 7.45. Found: C, 77.33; H, 7.49.

*Example 3.—3β,17-dibenzoxy-13,17-seco-13(18)-androstene*

A solution of 4.22 grams (0.0068 mole) of 3β,13α,17-tribenzoxy-13,17-secoandrostane in 25 milliliters of dimethylaniline was refluxed three hours, cooled and diluted with 150 milliliters of ether. The ether solution was washed three times with fifty-milliliter portions of ten percent hydrochloric acid and twice with 25-milliliter portions of five percent sodium carbonate. After drying over sodium sulfate, the ether was removed by distillation and the residue was recrystallized from isopropyl ether to yield 1.50 grams (44 percent) of 3β,17-dibenzoxy-13,17-seco-13(18)-androstene melting at 133 to 135 degrees centigrade and 0.33 gram (4.8 percent) of a second crop melting at 128 to 132 degrees centigrade. A sample of the first crop showed an $[\alpha]_D^{26}$ of minus eighteen degrees in chloroform.

Analysis.—Calculated for $C_{33}H_{40}O_4$: C, 79.17; H, 8.05. Found: C, 78.92; H, 7.98.

*Example 4.—3β,17-dibenzoxy-13,17-seco-13(18)-androstene*

This reaction was carried out in the same way as in Example 3 but chloroform instead of ether was used as solvent. From 2.67 grams (0.00429 mole) of 3β,13α,17-tribenzoxy-13,17-secoandrostane, 0.53 gram (24.7 percent) of 3β,17-dibenzoxy-13,17-seco-13(18)-androstene melting at 127 to 132 degrees centigrade were obtained.

*Example 5.—3β,17-dibenzoxy-13,17-seco-18-norandrostan-13-one*

A solution of 2.50 grams (0.005 mole) of 3β,17-dibenzoxy-13,17-seco-13(18)-androstene in 100 milliliters of methylene dichloride and one milliliter of pyridine was cooled to minus seventy degrees centigrade (Dry Ice-acetone bath) and ozonized with 6.5 millimoles of ozone (0.25 millimole of ozone per 200 milliliters of oxygen per minute for 25.5 minutes). The ozonized solution was then poured onto 2.5 grams of zinc dust, warmed to zero degrees centigrade, ten milliliters of acetic acid added, warmed to room temperature, and stirred vigorously for 1.25 hours. The mixture was then filtered, the filtrate diluted with 1.5 volumes of Skellysolve B (hexanes) and washed twice with 100-milliliter portions of water, three times with fifty-milliliter portions of cold five percent sodium hydroxide, and water until neutral. The organic solution was dried overnight over anhydrous sodium sulfate, filtered and the solvent removed by distillation. The glassy residue, after drying to constant weight at fifty degrees under reduced pressure, weighed 2.56 grams (theory 2.66 grams). Recrystallization from isopropyl alcohol gave 3β,17-dibenzoxy-13,17-seco-18-norandrostan-13-one melting at 116 to 117 degrees centigrade.

Analysis.—Calculated for $C_{32}H_{38}O_5$: C, 76.44; H, 7.62. Found: C, 76.30; H, 7.58.

A semicarbazone of this compound melted at 193 to 196 degrees centigrade and had an $[\alpha]_D^{23}$ of minus 34 degrees (chloroform).

Analysis.—Calc. for $C_{33}H_{41}N_3O_5$: C, 70.81; H, 7.38; N, 7.51. Found: C, 70.63; H, 7.42; N, 7.51.

*Example 6.—Hydrolysis of 3β,17-dibenzoxy-13,17-seco-18-norandrostan-13-one*

A solution of 1.48 grams (0.00293 mole) of 3β,17-dibenzoxy-13,17-seco-18-norandrostan-13-one in fifty milliliters ethyl alcohol, five milliliters water, and two grams of potassium hydroxide, was warmed to 45 degrees centigrade and allowed to stand overnight. The solvent was then removed by distillation under reduced pressure and the residue slurried with thirty milliliters of water, filtered, and dried overnight at fifty degrees under reduced pressure. The product weighed 0.79 gram (theory 0.84 gram) and melted at 150 to 165 degrees centigrade. Recrystallization from acetone gave 0.57 gram (68 percent) of the hemiketal of 3β,17-dihydroxy-13,17-seco-18-norandrostan-13-one melting at 174 to 176 degrees centigrade and having an $[\alpha]_D^{23}$ of plus two degrees (95 percent alcohol).

Analysis.—Calculated for $C_{18}H_{30}O_3$: C, 73.43; H, 10.27. Found: C, 73.30; H, 10.33.

Since the infrared spectra of this material showed strong hydroxyl but no carbonyl absorption, the structure is that of the hemiketal of 3β,17-dihydroxy-13,17-seco-18-norandrostan-13-one.

While these examples illustrate the application of this invention to the benzoxy derivatives, the invention is equally applicable to other acyloxy derivatives wherein the acyl radicals are derived from hydrocarbon carboxylic acids having from one to eight carbon atoms, inclusive.

*Example 7*

In the same manner as described in Example 1, 3β-propionoxy-13α-hydroxy-13,17-secoandrostan-17-oic acid lactone and 3β-benzoxy-13α-hydroxy-13,17-secoandrostan-17-oic acid lactone may be used as starting material for the lithium aluminum hydride reduction to 3β,13α,17-trihydroxy-13,17-secoandrostane.

*Example 8*

In the same manner as given in Example 2, the acylation-dehydration may be carried out with other acyl halides or anhydrides of hydrocarbon carboxylic acids containing from one to eight carbon atoms, inclusive; such as acetyl chloride, acetyl bromide, acetic anhydride, propionyl chloride, propionyl bromide, propionic anhydride, benzoyl bromide, or benzoic anhydride to give the corresponding 3β,13α,17-triacyloxy-13,17-secoandrostanes and 3β,17-diacyloxy-13,17-seco-13(18)-androstenes, which in turn can be converted to the corresponding 3β,17-diacyloxy-13,17-seco-18-norandrostan-13-ones and 3β,17-dihydroxy-13,17-seco-18-norandrostan13-one hemiketals.

It is to be understood that this invention is not to be limited to the exact details of operation or exact compounds shown and described as obvious modifications and equivalents will be apparent to one skilled in the art and the invention is therefore to be limited only by the scope of the appended claims.

We claim:

1. The process which comprises heating 3β,13α,17-triacyloxy-13,17-secoandrostane wherein the acyloxy group has the formula AcO, Ac being the acyl radical of a saturated organic carboxylic acid containing one to eight carbon atoms, inclusive, with a basic tertiary amine to produce the corresponding 3β,17-diacyloxy-13,17-seco-13(18)-androstene.

2. 3β,13α,17-trioxy-13,17-secoandrostane of the formula

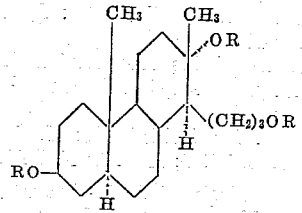

wherein R is selected from the group consisting of hydrogen and the acyl radical of a saturated hydrocarbon carboxylic acid containing from one to eight carbon atoms, inclusive.

3. 3β,17-diacyloxy-13,17-seco-13(18)-androstene of the formula

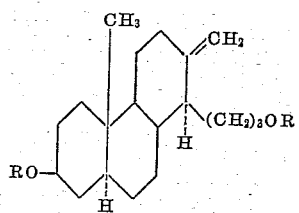

wherein R is an acyl radical of a saturated hydrocarbon carboxylic acid containing from one to eight carbon atoms, inclusive.

4. The process which comprises heating 3β,13α,17-tribenzoxy-13,17-secoandrostane with dimethylaniline to produce 3β,17-dibenzoxy-13,17-seco-13(18)-androstene.

5. 3β,13α,17-trihydroxy-13,17-secoandrostane.

6. 3β,13α,17-tribenzoxy-13,17-secoandrostane.

7. 3β,17-dibenzoxy-13,17-seco-13(18)-androstene.

8. The process which comprises heating 3β,13α,17-triacyloxy-13,17-secoandrostane wherein the acyloxy group has the formula AcO, Ac being the acyl radical of a saturated organic carboxylic acid containing one to eight carbon atoms, inclusive, with a basic tertiary amine to produce the corresponding 3β,17-diacyloxy-13,17-seco-13(18)-androstene, treating the reaction product with ozone and decomposing the ozonide to produce the corresponding 3β,17-diacyloxy-13,17-seco-18-norandrostan-13-one.

9. 3β,17-diacyloxy-13,17-seco-18-norandrostan-13-one of the formula

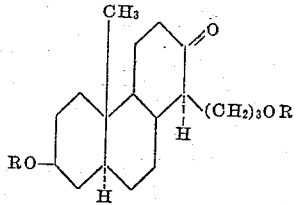

wherein R is an acyl radical of a saturated hydrocarbon carboxylic acid containing from one to eight carbon atoms, inclusive.

10. The process which comprises heating 3β,13α,17-tribenzoxy-13,17-secoandrostane with dimethylaniline to produce 3β,17-dibenzoxy-13,17-seco-13(18)-androstene, treating the reaction product with ozone and decomposing the ozonide to produce 3β,17-dibenzoxy-13,17-seco-18-norandrostan-13-one.

11. 3β,17-dibenzoxy-13,17-seco-18-norandrostan-13-one.

12. The process which comprises heating 3β,13α,17-triacyloxy-13,17-secoandrostane wherein the acyloxy group has the formula AcO, Ac being the acyl radical of a saturated organic carboxylic acid containing one to eight carbon atoms, inclusive with a basic tertiary amine to produce the corresponding 3β,17-diacyloxy-13,17-seco-13(18)-androstene, treating the reaction product with ozone, decomposing the ozonide to form the corresponding 3β,17-diacyloxy-13,17-seco-18-norandrostan-13-one and hydrolyzing with an alkali to form the hemiketal of 3β,17-dihydroxy-13,17-seco-18-norandrostan-13-one.

13. 3β,17-dihydroxy-13,17-seco-18-norandrostan-13-one hemiketal of the formula

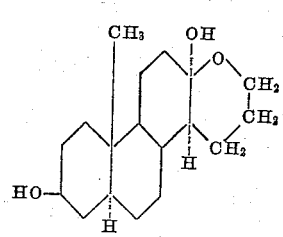

14. The process which comprises heating 3β,13α,17-tribenzoxy-13,17-secoandrostane with dimethylaniline to produce 3β,17-dibenzoxy-13,17-seco-13(18)-androstene, treating the reaction product with ozone, decomposing the ozonide to form 3β,17-dibenzoxy-13,17-seco-18-norandrostan-13-one and hydrolyzing with an alkali to form the hemiketal of 3β,17-dihydroxy-13,17-seco-18-norandrostan-13-one.

References Cited in the file of this patent

UNITED STATES PATENTS

| | | |
|---|---|---|
| 2,499,247 | Jacobsen et al. | Feb. 28, 1950 |
| 2,499,248 | Pincus et al. | Feb. 28, 1950 |

OTHER REFERENCES

Haberland: Berichte, 72:1215–21 (1939).